United States Patent Office 3,068,152
Patented Dec. 11, 1962

3,068,152
SUNBURN PREVENTIVE COMPOSITIONS
William T. Black, White Plains, N.Y., assignor to Union
Carbide Corporation, a corporation of New York
No Drawing. Filed Nov. 13, 1958, Ser. No. 773,558
13 Claims. (Cl. 167—90)

This invention relates in general to ultraviolet light absorbing compositions. More particularly, this invention is concerned with novel ultraviolet light absorbing compositions that are useful as sunburn preventives when applied to the human skin. These compositions contain as the active ingredient an organosilicon compound that absorbs the burning ultraviolet radiation of sunlight.

The present application is a continuation-in-part of patent applications S.N. 615,516, filed October 12, 1956, now abandoned, and S.N. 705,117, filed December 26, 1957, which issued as U.S. 2,973,383 on February 28, 1961.

It is known that solar rays having a wave length of from about 2500 to 3100 Angstrom units (i.e. rays of the ultraviolet spectrum) cause severe burning of human skin upon over-exposure to such rays. To diminish the burning and protect human skin, organic ultraviolet light absorbing compounds have been added to lotions and creams that are applied to the human body. These lotions and creams are generally called "suntan" compositions. Among the organic ultraviolet light absorbing compounds that are used in these "suntan" compositions, are for example, ortho and para-amino benzoic acid and their derivatives, salicylic acid and its derivatives, coumarin and the carbostyril derivatives. A list of the various ultraviolet light absorbing compounds has been tabulated with references to the literature [A.C. Giese et al., J. Am. Pharm. Assoc., Scientific Edition, 39, 30 (1950)].

The presently known "suntan" compositions in which the organo ultraviolet light absorbing compounds are used, take the form of emulsions, creams or alcoholic solutions. Also known are "suntan" compositions which contain silicone oils such as dimethylsiloxane oils and phenylmethylsiloxane oils as inert ingredients in addition to an organic ultraviolet light absorbing compound. In the known "suntan" compositions the organic ultraviolet light absorbing compound is extractable by water and as a result the organic ultraviolet absorbing compound is readily leached out by the action of water, for example, when swimming. Thus, the "suntan" composition must be reapplied upon leaving the water, if adequate protection from the burning solar rays is to be obtained.

It is an object of this invention to provide sunburn preventive compositions from which the ultraviolet light absorbing compound is not readily removed by the mere action of water. More particularly, it is the object of this invention to provide sunburn preventive compositions in which the ultraviolet light absorbing compound is an organosilicon compound that absorbs ultraviolet light in the range of from about 2500 to 3100 Angstrom units, and that are not readily removed by the action of water and thereby need not be reapplied after immersion in water.

The novel, ultraviolet light absorbing, sunburn preventive compositions of this invention, are those sunburn preventive compositions which contain as the active ultraviolet absorbing ingredient an organosilicon compound containing at least one silicon bonded phenylcarbamylalkyl group of the formula:

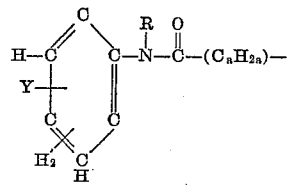

(1)

where Y is selected from the group consisting of carboxy

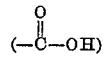

and carbalkoxy

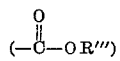

where R''' is an alkyl group with the provision that said group represented by Y is in the ortho or para position relative to the nitrogen atom, R is alkyl or hydrogen, a is an integer having a value of from 2 through 11 with the provision that there are at least two carbon atoms between the phenylcarbamyl group and the silicon atom. Said organosilicon compound is selected from the class consisting of organosilanes having at least one valence of silicon, other than the valence satisfied by the phenylcarbamylalkyl group, satisfied by an alkoxy group, the remaining valences of silicon being satisfied by monovalent hydrocarbon groups and organopolysiloxanes having all of the valences of silicon, other than the valences satisfied by said phenylcarbamylalkyl group and siloxane linkages, satisfied by monovalent hydrocarbon groups. The monovalent hydrocarbon groups are, for example, an alkyl group such as methyl, ethyl, propyl, butyl and the like, or an aryl group such as phenyl, naphthyl and tolyl and the like, and the alkoxy groups are, for example, methoxy, ethoxy, propoxy and the like as disclosed in my above-identified U.S. Patent No. 2,973,383. These organosilicon compounds are hereinafter referred to as phenylcarbamylalkyl silicon compounds.

The phenylcarbamylalkyl silicon compounds employed in the compositions of this invention include monomeric phenylcarbamylalkylalkoxysilanes, phenylcarbamylalkylsiloxanes and copolymeric siloxanes containing phenylcarbamylalkylsiloxane groups. The phenylcarbamylalkylalkoxysilanes employed in the compositions of this invention are those having the formula:

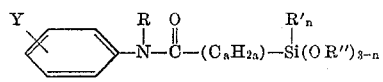

(2)

where R, Y and a have the above-defined meanings, R' represents a monovalent hydrocarbon group, and need not be the same throughout the same molecule, R'' represents an alkyl group and need not be the same throughout the same molecule, and n is an integer having a value of from 0 through 2.

The phenylcarbamylalkylsiloxanes employed in the compositions of this invention are those having the unit formula:

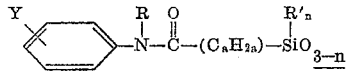

(3)

where R, R', Y, a and n have the above-defined meanings, but need not be the same throughout the same molecule although $n$ and $a$ are the same in the same unit.

The copolymeric siloxanes containing silicon-bonded phenylcarbamylalkyl groups employed in the compositions of this invention are those containing at least one unit represented by Formula 3 and one or more siloxane units depicted by the formula:

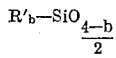

where R' has the above-defined value and $b$ is an integer having a value of from 0 through 3. R' and $b$ need not be the same throughout the same molecule, but $b$ is the same in the same unit.

Particularly preferred phenylcarbamylalkyl silicon compounds for use in the compositions of this invention are the monomeric silanes of Formula 2 and copolymeric siloxanes of the formula:

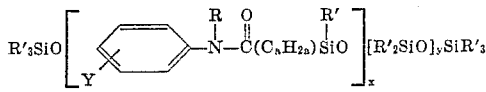

where R, R', Y and $a$ have the above-defined meanings, $x$ is an integer having a value of at least 1 and $y$ is an integer of zero or greater, since these organo-silicon compounds are normally liquid and are thus more easily dispersed in the compositions.

The phenylcarbamylalkyl silicon compounds employed in the compositions of this invention are practically odorless, and are not readily removed by the mere action of water.

The ultraviolet light absorbing, sunburn preventive compositions of this invention comprise a carrier in admixture with a phenylcarbamylalkyl-silicon compound and include solutions, oils, creams, and lotions as hereinafter described. The effectiveness of the sunburn preventive composition in absorbing ultraviolet light is dependent upon the concentration of the phenylcarbamyl silicon compound present in said composition or upon the thickness of the layer of said phenylcarbamylalkyl silicon compound deposited upon the human skin.

The sunburn preventive compositions of this invention preferably contain from 0.1 to 15.0 parts by weight of a phenylcarbamylalkylsilicon compound and from 85 to 99.9% of a non-ultraviolet light absorbing, inert, non-toxic carrier. By the term "carrier" as used herein is meant those materials which do not absorb ultraviolet light that are commonly used as dispersants for organic ultraviolet light absorbing compounds. Among the suitable carriers are, solvents, such as, ethanol, isopropanol, glycerine, propylene glycol laurate, mineral oil, propylene glycol, triethanol amine and the like, which are conventionally used in producing suntan lotions. Also included as carriers are the cream base materials. By the term "cream base material" as used herein is meant a cosmetic cream prepared in the conventional manner. Among some of the products used in producing cream base materials are stearic acid, propylene glycol, cetyl alcohol, lanolin, mineral oil, beeswax, triethanolamine and the like. The amount of the phenylcarbamylalkylsilicon compound employed in the compositions of this invention is adjusted so that a thin film of the composition (approx. 25 microns thick) will absorb greater than 90% of the transmitted ultraviolet light having a wave length of from about 2500 to about 3100 Angstrom units. It will be known to those skilled in the art that sunburn preventive compositions containing lesser amounts of the phenylcarbamylalkyl silicon compound will still absorb some of the ultraviolet light and prevent sunburn in special instances. Those skilled in the art can best determine the amount of the phenylcarbamylalkylsilicon compound needed in their sunburn preventive compositions by measuring the amount of ultraviolet light absorbed by a thin film of the composition by means of an ultraviolet spectrophotometer. Amounts of the phenyl carbamylalkylsilicon compound greater than that described above can also be employed; however, no commensurate advantages are obtained thereby.

In producing the novel sunburn preventive compositions of this invention, a mixture of phenylcarbamylalkylsilicon compound in a carrier is prepared according to techniques known to those skilled in the art.

The preparation of some sunburn preventative oils, cream and lotion compositions are illustrated by the following general examples.

(1) A preparation of the consistency of cream may be compounded by forming an emulsion according to known procedures and containing the following materials:

| | Parts by weight |
|---|---|
| Ultraviolet light absorbing phenylcarbamylalkyl-silicon compound | 0.1–15 |
| White mineral oil | 29–44.9 |
| Lanolin | 25 |
| Water | 31 |

(2) An alcoholic lotion may be compounded by forming a mixture of the following:

| | Parts by weight |
|---|---|
| Ultraviolet light absorbing phenylcarbamylalkyl-silicon compound | 0.1–15 |
| Propylene glycol laurate | 15 |
| Alcohol | 70–84.9 |

(3) A suntan oil may be compounded by forming a mixture of the following:

| | Parts by weight |
|---|---|
| Ultraviolet light absorbing phenylcarbamylalkyl-silicon compound | 0.1–15 |
| Sesame oil | 36 |
| White mineral oil | 49–63.9 |

In the above preparations coloring agents and perfumes may be added as desired.

The phenylcarbamylalkyl silicon compounds, employed in the compositions of this invention are prepared by reacting ortho and para-aminobenzoic acid with carboxyalkylsilane and siloxanes as well as with the esters of the carboxyalkylsilanes and siloxanes as well as the acid halide derivatives of the carboxyalkylsiloxanes. The phenylcarbamylalkylsilanes and siloxane as well as a process for their preparation are disclosed in copending patent applications S.N. 615,516, filed October 12, 1956, now abandoned, and S.N. 705,117 filed December 26, 1957, now U.S. 2,973,383, of which this application is a continuation in part.

The following examples are set forth by way of illustration only and are not to be construed as limitations on my invention.

EXAMPLE I

Beta-carbethoxyethyltriethoxysilane (0.2 mole) and p-aminobenzoic acid (0.2 mole) were heated, in a flask fitted with a still head, to a temperature of 150° C. Ethanol began to reflux and the refluxing was continued for thirty-two (32) hours. The ethanol was then distilled off and the residue was vacuum stripped at 150–200° C. The resulting product was dissolved in chloroform, filtered and then stripped of chloroform to yield beta - (N - para - carboxyphenyl) carbamylethyltriethoxysilane which was a viscous resin-like material. This material proved to be an excellent ultraviolet absorber in the 2600 to 3100 A. range. The ultraviolet light absorption of this material was measured by means of an ultraviolet spectrophotometer. The percent transmission through a solution containing 0.041 gram per liter of the product is ethanol in a cell having a thickness of 1 cm., is given below:

Wavelength (A.): Percent transmission
2600 _____ 16.5
2700 _____ 7.0
2800 _____ 4.0
2900 _____ 4.0
3000 _____ 5.5
3100 _____ 14.5

EXAMPLE II

Bis-trimethylsiloxymethyl-beta-carboxypropylsilane

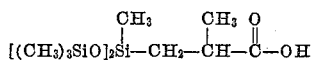

prepared by the acid equilibration of hexamethyldisiloxane and beta-carboxypropylmethylsiloxane was treated with thionyl chloride to yield the acid chloride

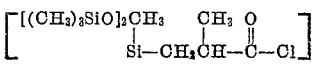

Ethyl-p-aminobenzoate (60 g.) was dissolved in anhydrous dimethyl-Cellosolve (200 cc.) and charged into a 1 liter, 3-necked flask fitted with a motor-driven stirrer. The acid chloride above (31.5 g.) was charged into a dropping funnel and added drop-wise with vigorous stirring to the dimethyl-Cellosolve solution of ethyl-p-aminobenzoate (time of addition—½ hour). The stirring was continued for 1½ hours. A slight rise in temperature was noted during the addition. Water (200 ml.) was added and the mixture extracted with diethylether to remove the silane. The ether solution was washed with 15 percent hydrochloric acid three times to remove the unreacted ethyl-p-aminobenzoate. The ether solution was then washed with distilled water until the water washings were free of chloride ions (AgNO₃ test). The ether was then evaporated off and 150 cc. of toluene added. The toluene and any residual water was then removed by vacuum stripping (less than 1 mm.) at 100° C. for 2 hours. The residue was identified as being bis-trimethylsiloxy methyl-beta-(para-carbethoxyphenyl)carbamylpropylsilane.

A thin film of bis-trimethylsiloxy methyl-beta-(para-carbethoxyphenyl) carbamylpropylsilane applied to a quartz slide from a 2% solution in ethanol, was found to absorb greater than 90% of the ultraviolet rays of sunlight in the range of 2500 A. to 3100 A.

EXAMPLE III

Step A

A dimethylsiloxane oil having the average formula:

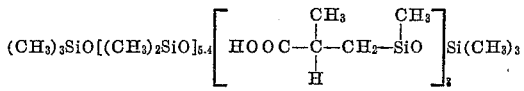

(50 g. was charged into a 250 ml. round-bottomed flask and thionyl chloride (36.2 g.) added with shaking. After the reaction solution was allowed to stand overnight at room temperature, protected from atmospheric moisture by a drying tube filled with anhydrous calcium sulfate, the excess thionyl chloride was removed by vacuum stripping at 40° C. for 1½ hours. A free flowing oil (49.9 g.) tan in color, was obtained which contained silicon-bonded acid chloride alkyl groups.

Step B

Ethyl-p-aminobenzoate (60 g.) was dissolved in 250 cc. of anhydrous dimethyl Cellosolve and charged into a 1-litter 3-necked flask fitted with a dropping funnel and a motor-driven stirrer.

The oil containing the silicon-bonded acid chloride alkyl groups obtained in step A was dissolved in 100 cc. of anhydrous dimethyl Cellosolve and charged into the dropping funnel. The solution of this oil was added slowly (over one-half hour period) to the ethyl-p-aminobenzoate solution. The solution turned cloudy and was stirred for an additional 2 hours. Distilled water 200 cc. was then added and the siloxane oil extracted with diethyl ether. The ether solution was washed three times with 15 percent HCl and then with distilled water until the water washings were free of chloride (AgNO₃ test). The ether was evaporated off and toluene (200 cc.) added. The toluene and any residual water was then removed by vacuum stripping for 2 hours at 80° C. A viscous oil having the average formula:

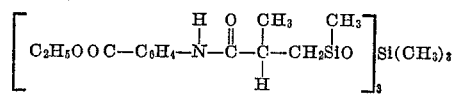

was obtained.

A thin film of this oil when applied to a quartz plate from an alcoholic solution containing approximately 2% by weight of the oil based on the total weight of the lotion would absorb greater than 90% of the ultraviolet rays of sunlight in the range, 2500 A. to 3000 A. The film is not removable by the mere action of water.

EXAMPLE IV

Fifty grams of a dimethyl-siloxane oil having the average formula:

(CH₃)₃SiO[(CH₃)₂SiO]₃
[CH₃SiO—C₃H₆—COOH]₃Si(CH₃)₃ was charged into a 250 m. round-bottomed flask and thionyl chloride (36 g.) added with shaking. The reaction solution was then allowed to stand overnight at room temperature protected from moisture by a drying tube filled with anhydrous calcium sulfate.

The excess thionyl chloride was then removed by vacuum stripping at 40° C. for 1½ hours. A tan free flowing siloxane oil (49 g.) containing silicon-bonded acid halide alkyl groups resulted.

Ethyl-p-aminobenzoate (62 g.) was dissolved in 150 cc. of dry dimethyl Cellosolve and charged into a 1 liter, three-necked, round-bottomed flask fitted with a motor-driven stirrer.

The modified siloxane oil (49 g.) prepared above was dissolved in dimethyl Cellosolve (75 cc.) and charged into a dropping funnel. The oil was added slowly (½ hour) with stirring to the ethyl-p-aminobenzoate solution. A slight rise in temperature was noted and solution became cloudy. The reaction mixture was then stirred for an additional 2 hours.

Water (200 cc.) was added and the resulting siloxane oil extracted with diethyl ether (approx. 300 cc.). The ether solution was washed three times with 15 percent HCl and then with distilled water until the water washings were free of chloride ions (AgNO₃ test). The ether was evaporated off and toluene (200 cc.) was added. The toluene and any residual water was removed by vacuum stripping at 80° C. for 2 hours.

A low melting solid residue was recovered. The residue was identified as having the following average formula:

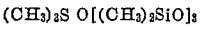

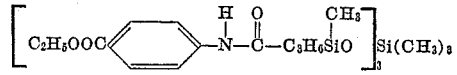

This material absorbs ultraviolet light.

The above prepared organosilicon compound can be dispersed in a carrier to form a sunburn preventive composition.

EXAMPLE V

In a 150 cc. beaker was mixed 2.0 g. of the bis-trimethylsiloxybeta(paracarbethoxyphenyl)carbamylpropylmethylsilane:

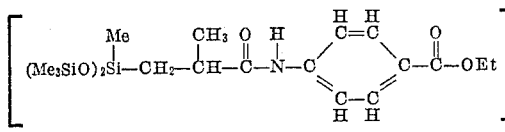

10 g. propylene glycol laurate, 10 g. of glycerol, 65 g. absolute alcohol, and 15 g. of distilled water.

On mixing the above ingredients a clear, tan colored sunburn preventive composition resulted.

A quartz slide was dipped into the above sunburn preventive composition solution and the slide air dried 48 hours. The air drying was used to allow the alcohol to evaporate. The air drying was used to simulate application to the human skin, whereon the contained alcohol is caused to evaporate by the body heat thus depositing a protective film. One side of the slide was wiped clear and the slide tested for ultraviolet ray absorption by means of an ultraviolet spectrophotometer with the following results:

Wavelength: Transmission
   from 2200 to 3080 A._____Less than 0.3 percent

The above prepared organosilicon compound can also be dispersed in other carriers to yield other sunburn preventive creams, lotions and oils.

EXAMPLE VI

A siloxane oil (30 g.) having the average formula:

$(CH_3)_3SiO[HOOC-C_3H_6Si(CH_3)O]_{10.3}[(CH_3)_2SiO]_{45}Si(CH_3)_3$ was mixed with p-aminobenzoic acid (9.0 g.) in a 250 ml. flask fitted with a distillation head. A mixture containing toluene (45 ml. n-butanol) (45 ml.) was added and the contents of the flask heated to reflux. The refluxing was continued for 148 hours. The toluene, butanol and any water formed during the reaction was removed by vacuum evaporation at 100° C. The residue was filtered to yield a light brown oil (40 g.). The oil was washed with toluene and vacuum evaporated a second time. Infra-red analysis of the resultant oil indicated it to be a linear siloxane oil containing combined

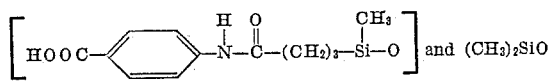

units in its structure. The oil absorbs ultraviolet light in the 2500 A. to 3300 A. region. The oil is soluble in ethanol and dimethyl silicon oils. This oil when dispersed in a carrier forms a sunburn preventive composition.

EXAMPLE VII

A siloxane oil (50 g.) having the average formula:

$(CH_3)_3SiO[HOOC-C_3H_6Si(CH_3)O]_3[(CH_3)_2SiO]_{69.5}Si(CH_3)_3$ was charged into a 200 cc. round-bottomed flask. Thionyl chloride (13.5 g.) was added. The reactants were shaken and allowed to stand at room temperature for 1 hour. The flask was then heated to 90° C. in an oil bath and the excess thionyl chloride stripped under vacuum. Ethyl-p-aminobenzoate (10 g.) was partially dissolved in toluene (100 cc.) and the mixture added to the above stripped oil. The resulting oil was dissolved in diethylether and filtered. The ether and toluene were then stripped off under vacuum at 100° C. The oil was then dissolved in diethylether and washed with 10% hydrochloric acid to remove the unreacted ethyl-p-aminobenzoate. The ether solution was washed with distilled water until the water washings were free of chloride ions. Toluene (100 cc.) was added and the toluene, ether and any water present removed by vacuum evaporation at 110° C. A light tan oil (47.5 g.) containing combined $[(CH_3)_2SiO]$ and $[C_2H_5OOC-C_6H_4-NH-COC_3H_6Si(CH_3)O]$ units, was recovered. This oil and ethanol solution of absorbed ultraviolet light in the 2300 A. to 3100 A. region thus showing its utility as a sunburn preventative in suntan formulations.

What is claimed is:

1. A sunburn preventive composition to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein from 0.1 to 15 percent by weight of an ultraviolet light absorbing organo-silicon compound containing at least one silicon-bonded phenylcarbamylalkyl group of the formula:

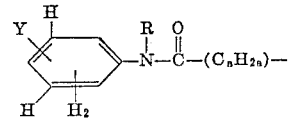

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, said organosilicon compound being selected from the class consisting of organosilanes having at least one valance of silicon, other than the valence satisfied by the phenylcarbamylalkyl groups satisfied by an alkoxy group attached to silicon by an oxygen-silicon bond, the remaining valences of silicon being satisfied by monovalent hydrocarbon groups and an organopolysiloxane having all its valences other than the valences satisfied by said phenylcarbamylalkyl group and siloxane linkages, satisfied by monovalent hydrocarbon groups.

2. Sunburn preventive compositions comprising in admixture with cream base material from 0.1 to 15 percent by weight of an ultraviolet absorbing organosilicon compound containing at least one silicon-bonded phenylcarbamylalkyl group of the formula:

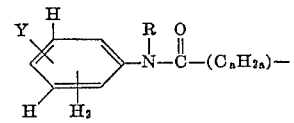

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, said organosilicon compound being selected from the class consisting of organosilanes having at least one valence of silicon other than the valence satisfied by the phenyl carbamylalkyl groups, is satisfied by an alkoxy group attached to silicon by an oxygen-silicon bond, the remaining valences of silicon being satisfied by monovalent hydrocarbon groups and an organopolysiloxane having all the valences of silicon other than the valences satisfied by said phenylcarbamylalkyl group and siloxane linkages, satisfied by monovalent hydrocarbon groups.

3. Sunburn preventive lotion compositions comprising in admixture with glycerine, propylene glycol laurate, and ethanol from 0.1 to 15 percent by weight of an ultraviolet light absorbing organosilicon compound containing at least one silicon-bonded phenylcarbamylalkyl group of the formula:

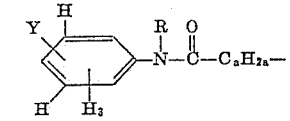

wherein R is a member selected from the class consisting of hydrogen and alkyl groups, Y is a member selected from the class consisting of carboxy and carbalkoxy group, $a$ is an integer of from 2 through 11 with the provision that there are at least two carbon atoms between the phenylcarbamyl group and the silicon atom, said organosilicon compound being selected from the class consisting of organosilanes having at least one valence of silicon, other than the valence satisfied by the phenylcarbamylalkyl groups satisfied by an alkoxy group attached to silicon by an oxygen-silicon bond, the remaining valences of silicon being satisfied by monovalent hydrocarbon groups and an organopolysiloxane having all its valences other than the valences satisfied by said phenylcarbamylalkyl group and siloxane linkages, satisfied by monovalent hydrocarbon groups.

4. A composition as claimed in claim 1 wherein the organosilicon compound is beta-(para-carbethoxyphenyl)-carbamylethyltriethoxysilane.

5. A composition as claimed in claim 1 wherein the organosilicon compound is bis-trimethylsiloxy beta-(para-carbethoxyphenyl)carbamylpropylmethylsilane.

6. A composition as claimed in claim 3 wherein the organosilicon compound is bis-trimethylsiloxy beta-(para-carbethoxyphenyl) carbamylpropylmethylsilane.

7. A method of preventing the sunburning of human skin which comprises applying to the human skin surface a composition which comprises a suitable carrier having dispersed therein from 0.1 to 15 percent by weight of an ultraviolet light absorbing organosilicon compound containing at least one silicon-bonded phenylcarbamylalkyl group of the formula:

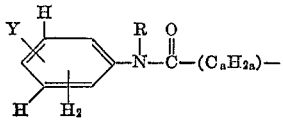

wherein R is a member selected from the class consisting of hydrogen and alkyl groups, Y is a member selected from the class consisting of carboxy and carbalkoxy groups, $a$ is an integer from 2 through 11 with the provision that there are at least two carbon atoms between the phenylcarbamyl group and the silicon atom, said organosilicon compound being selected from the class consisting of organosilanes having at least one valence of silicon, other than the valence satisfied by the phenylcarbamylalkyl groups satisfied by an alkoxy group attached to silicon by an oxygen to silicon bond, the remaining valences of silicon being satisfied by monovalent hydrocarbon groups and an organopolysiloxane having all its valences other than the valences satisfied by said phenylcarbamylalkyl group and siloxane linkages, satisfied by monovalent hydrocarbon groups.

8. A sunburn preventive composition to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein from 0.1 to 15 percent by weight of an ultraviolet light absorbing organosilane having the formula:

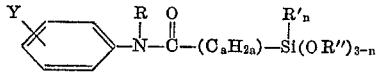

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, R" is an alkyl group, and $n$ is an integer having a value of from 0 through 2.

9. Sunburn preventive compositions comprising in admixture with cream base material from 0.1 to 15 percent by weight of an ultraviolet light absorbing organosilane having the formula:

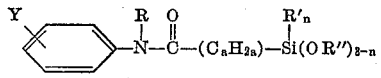

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, R" is an alkyl group, and $n$ is an integer having a value of from 0 through 2.

10. A sunburn preventive composition to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein from 0.1 to 15 percent by weight of an ultraviolet light absorbing organopolysiloxane having the unit formula:

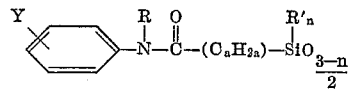

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, and $n$ is an integer having a value of from 0 through 2.

11. Sunburn preventive compositions comprising in admixture with cream base material from 0.1 to 15 percent by weight of an ultraviolet light absorbing organopolysiloxane having the unit formula:

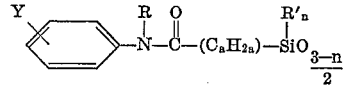

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, and $n$ is an integer having a value of from 0 through 2.

12. A sunburn preventive composition to be applied as a coating to human skin which comprises an inert, non-toxic, non-ultraviolet light absorbing carrier selected from the class consisting of ethanol, isopropanol, glycerine, propylene glycol laurate and mixtures thereof having dispersed therein from 0.1 to 15 percent by weight of an ultraviolet light absorbing copolymeric organosiloxane containing at least one unit of an organosiloxane having the unit formula:

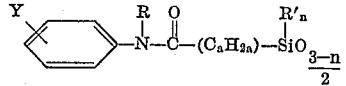

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, and $n$ is an integer having a value of from 0 through 2, and at least one siloxane unit having the unit formula:

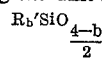

wherein R' is defined above and $b$ is an integer having a value of from 0 through 3.

13. Sunburn preventive compositions comprising in admixture with cream base material from 0.1 to 15 percent by weight of an ultraviolet light absorbing copolymeric organosiloxane containing at least one unit of an organosiloxane having the unit formula:

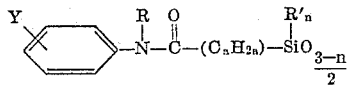

wherein R is a member selected from the class consisting of hydrogen and alkyl groups, Y is a member selected from the class consisting of carboxy and carbalkoxy groups, $a$ is an integer of from 2 through 11 with the provision that there are at least two carbon atoms between the phenylcarbamyl group and the silicon atom, R' is a monovalent hydrocarbon group, and $n$ is an integer having a value of from 0 through 2, and at least one siloxane unit having the unit formula:

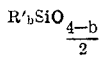

wherein R' is defined above and $b$ is an integer having a value of from 0 through 3.

References Cited in the file of this patent

UNITED STATES PATENTS

| | | |
|---|---|---|
| 2,610,198 | Sommer | Sept. 9, 1952 |
| 2,723,987 | Speier | Nov. 15, 1955 |
| 2,819,245 | Shorr | Jan. 7, 1958 |
| 2,928,858 | Morehouse | Mar. 15, 1960 |
| 2,929,829 | Morehouse | Mar. 22, 1960 |

OTHER REFERENCES

Giese: J. Amer. Pharm. Asso., Sci. Ed., January 1950, pp. 30–36.

Sagarin: Cosmetics Sci. and Tech., Interscience Pub., New York, 1957, pages 197–204.

Currie: J. Soc. of Cos. Chemists, 7:3, May 1956, pages 1 to 15.